United States Patent
Tan et al.

(10) Patent No.: US 11,804,238 B2
(45) Date of Patent: Oct. 31, 2023

(54) OPTIMIZATION METHOD FOR IMPLEMENTATION OF MEL-FREQUENCY CEPSTRAL COEFFICIENTS

(71) Applicant: REALTEK SEMICONDUCTOR CORP., Hsinchu (TW)

(72) Inventors: Li-Li Tan, Suzhou (CN); Zhi-Lin Wang, Suzhou (CN); Xiao-Feng Cao, Suzhou (CN); Xiao-Huan Li, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 230 days.

(21) Appl. No.: 17/514,251

(22) Filed: Oct. 29, 2021

(65) Prior Publication Data
US 2022/0399031 A1 Dec. 15, 2022

(30) Foreign Application Priority Data
Jun. 11, 2021 (CN) .......................... 202110652181.6

(51) Int. Cl.
*G10L 25/00* (2013.01)
*G10L 25/18* (2013.01)
(Continued)

(52) U.S. Cl.
CPC ............ *G10L 25/18* (2013.01); *G06F 17/142* (2013.01); *G06F 17/147* (2013.01); *G10L 25/24* (2013.01)

(58) Field of Classification Search
CPC ............... G10L 15/02; G10L 2013/021; G10L 2013/105; G10L 15/1807;
(Continued)

(56) References Cited

U.S. PATENT DOCUMENTS

| 7,103,547 | B2* | 9/2006 | Kao | ........................ G10L 15/28 704/200 |
| 2002/0198706 | A1* | 12/2002 | Kao | ........................ G10L 15/28 704/E15.046 |

(Continued)

OTHER PUBLICATIONS

Wang, Jia-Ching, Jhing-Fa Wang, and Yu-Sheng Weng. "Chip design of MFCC extraction for speech recognition." Integration 32.1-2 (2002): 111-131. (Year: 2002).*

(Continued)

*Primary Examiner* — Edgar X Guerra-Erazo
(74) *Attorney, Agent, or Firm* — Li & Cai Intellectual Property (USA) Office

(57) ABSTRACT

An optimization method for an implementation of mel-frequency cepstral coefficients is provided. The optimization method includes the following steps: performing a framing step, including using a 400×16 static random access memory to temporarily store a plurality of sampling points of a sound signal with overlap, and decomposing the sound signal into a plurality of frames. Each of the plurality of frames is 400 of the sampling points, there is an overlapping region between adjacent two of the plurality of frames, and the overlapping region includes 240 of the sampling points. The optimization method further includes performing a windowing step, which includes multiplying each of the plurality of frames by a window function in a bit-level design, and the optimization method includes performing a fast Fourier transform (FFT) step, which includes applying a 512 point FFT on a frame signal to obtain a corresponding frequency spectrum.

9 Claims, 1 Drawing Sheet

(51) Int. Cl.
*G06F 17/14* (2006.01)
*G10L 25/24* (2013.01)

(58) Field of Classification Search
CPC ..... G10L 2019/0011; G10L 2019/0012; G10L 19/0018; G10L 19/002; G10L 19/005; G10L 19/0204; G10L 19/022; G10L 19/025; G10L 19/03; G10L 19/032; G10L 19/04; G10L 19/06; G10L 19/07; G10L 19/08; G10L 19/083; G10L 19/087; G10L 19/09; G10L 19/093; G10L 19/097; G10L 19/12; G10L 19/10; G10L 19/125; G10L 19/13; G10L 19/135; G10L 19/167; G10L 19/173; G10L 19/18; G10L 19/26; G10L 19/265; G10L 21/0224; G10L 21/0232; G10L 21/047; G10L 21/045; G10L 21/049; G10L 25/12; G10L 25/15; G10L 25/18; G10L 25/21; G10L 25/24; G10L 25/27; G10L 25/45; G10L 25/60; G10L 25/69; G10L 25/75; G10L 25/81; G10L 25/84; G10L 25/87; G10L 2025/783; G10L 2025/932; G10L 2025/935; G10L 2025/937; G10L 25/93; H04R 3/00
See application file for complete search history.

(56) References Cited

U.S. PATENT DOCUMENTS

2008/0049943 A1\* 2/2008 Faller ..................... H04S 3/008
381/17
2021/0263991 A1\* 8/2021 Feng ..................... G06F 7/4812

OTHER PUBLICATIONS

R. Vergin, D. O'Shaughnessy and V. Gupta, "Compensated mel frequency cepstrum coefficients," 1996 IEEE International Conference on Acoustics, Speech, and Signal Processing Conference Proceedings, Atlanta, GA, USA, 1996, pp. 323-326 vol. 1, doi: 10.1109/ICASSP.1996.541097. (Year: 1996).\*

Glittas, Antony Xavier, and Lakshminarayanan Gopalakrishnan. "A low latency modular-level deeply integrated MFCC feature extraction architecture for speech recognition." Integration 76 (2021): 69-75. (Year: 2021).\*

Zhang, Yanming, et al. "Optimization and evaluation of energy-efficient mixed-signal MFCC feature extraction architecture." 2020 IEEE Computer Society Annual Symposium on VLSI (ISVLSI). IEEE, 2020. (Year: 2020).\*

Touazi, Azzedine, and Mohamed Debyeche. "An efficient low bit-rate compression scheme of acoustic features for distributed speech recognition." Computers & Electrical Engineering 51 (2016): 12-25. (Year: 2016).\*

\* cited by examiner

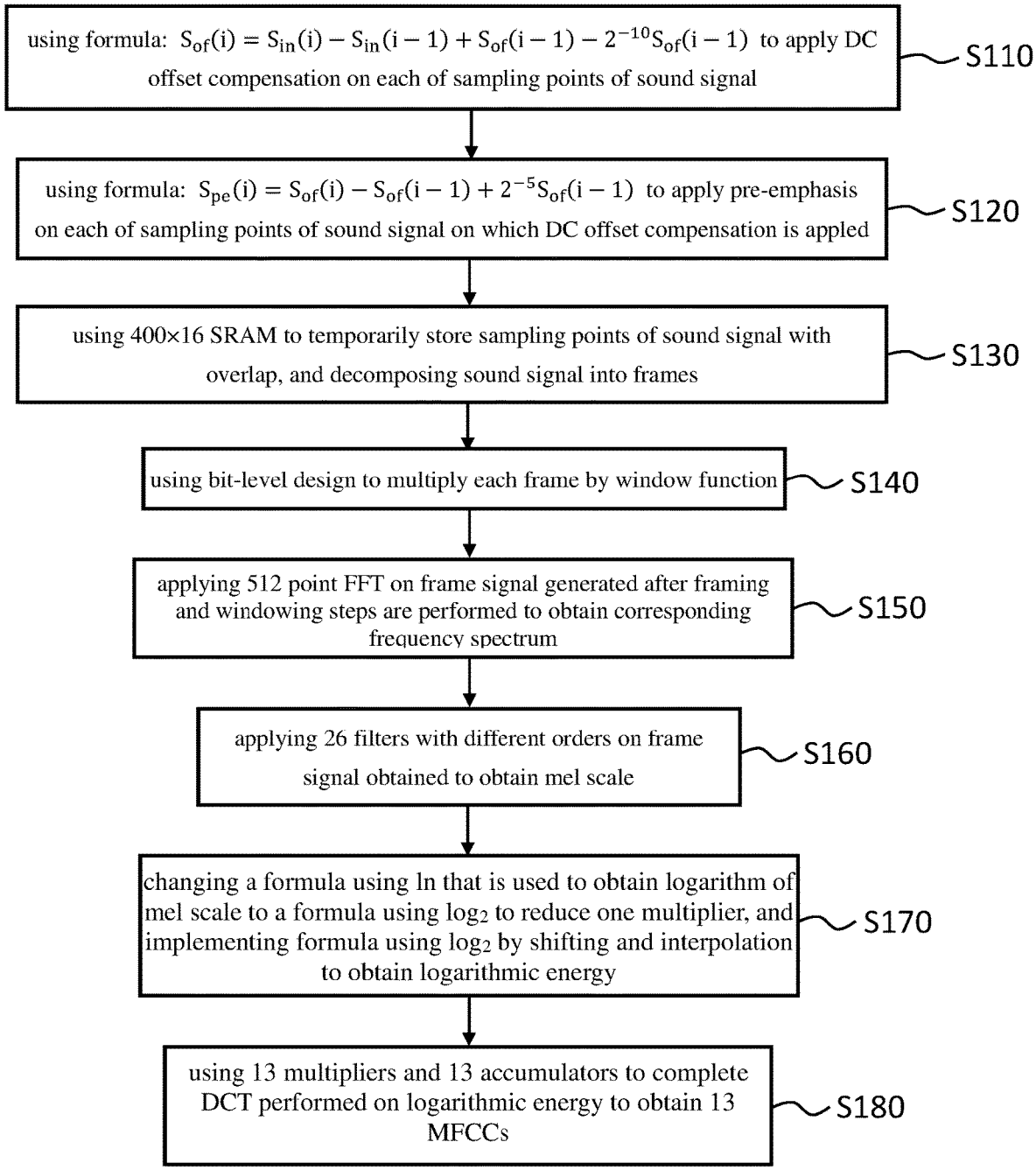

OPTIMIZATION METHOD FOR IMPLEMENTATION OF MEL-FREQUENCY CEPSTRAL COEFFICIENTS

CROSS-REFERENCE TO RELATED PATENT APPLICATION

This application claims the benefit of priority to China Patent Application No. 202110652181.6, filed on Jun. 11, 2021 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an implementation of mel-frequency cepstral coefficients, and more particularly to an optimization method for an implementation of mel-frequency cepstral coefficients.

BACKGROUND OF THE DISCLOSURE

In sound processing, mel-frequency cepstrum (MFC) is based on a linear transform of a log power spectrum on a nonlinear mel scale of frequency, and mel-frequency cepstral coefficients (MFCC) are coefficients that collectively make up an MFC. MFCC has been widely used in language recognition, and an implementation of MFCC mainly includes the following steps.

1. Framing: decomposing a sound signal into a plurality of frames, and each of the plurality of frames is 400 sampling points of the sound signal.
2. Windowing: multiplying each of the plurality of frames by a window function, such as a Hamming window, to increase continuity between left and right ends of one frame.
3. Fast Fourier Transform (FFT): performing an FFT on a frame signal that is generated after the framing and windowing are performed to obtain a corresponding frequency spectrum.
4. Mel filtering: applying a mel filter on the spectrum obtained from the frame signal to obtain a mel scale.
5. Non-linear Transformation: obtaining a logarithm of the mel scale obtained from the mel filter.
6. Discrete Cosine Transform (DCT): performing a DCT on an obtained logarithmic energy, so as to convert the logarithmic energy into a cepstrum domain and obtain MFCC.

However, the above steps need to be improved. Therefore, providing an optimization method for the implementation of MFCC has become an important issue in the related art.

SUMMARY OF THE DISCLOSURE

In response to the above-referenced technical inadequacies, the present disclosure provides an optimization method for an implementation of mel-frequency cepstral coefficients, and the optimization method includes the following steps: performing a framing step, including using a 400×16 static random access memory to temporarily store a plurality of sampling points of a sound signal with overlap, and decomposing the sound signal into a plurality of frames. Each of the plurality of frames is 400 of the sampling points, there is an overlapping region between adjacent two of the plurality of frames, and the overlapping region includes 240 of the sampling points. The optimization method further includes performing a windowing step, which includes multiplying each of the plurality of frames by a window function in a bit-level design, and the optimization method includes performing a fast Fourier transform (FFT) step, which includes applying a 512 point FFT on a frame signal generated after the framing step and the windowing step are performed, so as to obtain a corresponding frequency spectrum.

Preferably, the FFT step further includes using a coordinate rotational digital computer to complete all of multiplication operations of the FFT.

Preferably, the optimization method further includes performing a mel filtering step, which includes applying 26 filters with different orders on the frame signal to obtain a mel scale and utilizing two multipliers and two adders to implement all operations of the mel filtering step.

Preferably, the optimization method further includes performing a nonlinear conversion step, which includes: changing a natural logarithm, that is used to obtain a logarithm of the mel scale, to a binary logarithm to reduce one multiplier, and implementing the binary logarithm by shifting and interpolation to obtain logarithmic energy.

Preferably, the optimization method further includes performing a discrete cosine transform (DCT) step on the obtained logarithmic energy by using 13 multipliers and 13 accumulators to obtain 13 mel-frequency cepstral coefficients (MFCCs).

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 1 is a flow chart of an optimization method for an implementation of MFCC provided by one embodiment of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a flow chart of an optimization method for an implementation of MFCC provided by one embodiment of the present disclosure. As shown in FIG. 1, in step S130 for performing a framing step, the present embodiment uses a 400×16 static random access memory (SRAM) to temporarily store a plurality of sampling points of a sound signal with overlap, and decomposes the sound signal into a plurality of frames.

Each frame has 400 sampling points, and in order to avoid excessive changes between two adjacent frames, the present embodiment will allow an overlapping region between two adjacent frames, and the overlapping region includes 240 sampling points. That is to say, the frames are separated by 160 sampling points. Next, in step S140 for performing a windowing step, the present embodiment uses a bit-level design to multiply each frame by a window function. The window function can be a Hamming window, and a formula for multiplying each frame by the Hamming window is:

$$S'_w(n) = \left\{0.54 - 0.46 \times \cos\left(\frac{2\pi(n-1)}{N-1}\right)\right\} \times S_w(n), 1 \le n \le N;$$

where N is a window length, that is, in this embodiment, N is the number of sampling points in the frame, that is, 400. In addition, $S_w(n)$ is an n-th sampling point in the frame, and $S_w'(n)$ is an n-th sampling point in the frame after being multiplied by the Hamming window.

Then, in step S150 for performing a fast Fourier transform (FFT) step, the present embodiment applies a 512 point FFT on the frame signal generated after the framing step and the windowing step are performed, that is, $S_w'(1)$ to $S_w'(400)$, to obtain a corresponding frequency spectrum. It should be noted that, in step S150 for performing the FFT step, the present embodiment can further use a coordinate rotational digital computer to complete all multiplication operations of the FFT.

It can be seen that, compared with the existing technique, the present disclosure provides the optimization method for the implementation of the MFCC. In addition, in a step S160 for performing mel filtering step, the present embodiment applies 26 filters with different orders on the frame signal obtained from the frame signal to obtain a mel scale.

However, the mel scale needs to be calculated independently, the last filter requires 45 multiplication operations. Therefore, in the step S160 for performing the mel filtering step, the present embodiment further utilizes two multipliers and two adders to implement all operations of the mel filter according to characteristics of all odd-numbered filters or all even-numbered filters will be connected end to end.

In addition, in step S170 for performing a non-linear conversion step, the present embodiment changes a formula using a natural logarithm (ln), that is used to obtain a logarithm of the mel scale, to a formula using a binary logarithm ($\log_2$) to reduce one multiplier, and implementing the formula using the binary logarithm by shifting and interpolation to obtain logarithmic energy. The formula using the natural logarithm can be represented as:

$$s(m) = \ln(\Sigma_{k=0}^{N-1} |X_a(k)|^2 H_m(k)) \cdot 0 \le m \le M;$$

where s(m) is the logarithmic energy, $X_a(k)$ is the frequency spectrum, and $H_m(k)$ is the filter. In addition, M and N are the number of filters and an FFT length, respectively, which are 26 and 512, and the formula using the binary logarithm can be represented as:

$$s(m) = \log_2(\Sigma_{k=0}^{N-1} X_a(k) | H_m(k)) \cdot 0 \le m \le M.$$

Finally, since a particularity of a 26×13 matrix cannot utilize characteristics of symmetric coefficients in an existing method for implementation MFCCs, in step S180 for performing discrete cosine transform (DCT) step, the present embodiment directly uses 13 multipliers and 13 accumulators to complete a DCT performed on the logarithmic energy to obtain 13 MFCCs, that is, a formula used in the present step can be represented as:

$$MFCC = \sum_{m=0}^{N-1} s(m) \cos\left(\frac{\pi n(m-0.5)}{M}\right) \times \left[1 + \left(\frac{L_f}{2}\right) \times \sin\left(\frac{n\pi}{L_f}\right)\right];$$

where n=1, 2, . . . , L, and L refers to a coefficient order of the MFCC. Those skilled in the art can decide which 13 MFCCs to choose according to actual needs, and $L_f$ is 22.

On the other hand, before the framing step, the optimization method for the implementation of MFCC can further include a DC Offset compensation step and a pre-emphasis step, and an existing formula for performing DC offset compensation is:

$$S_{of}(i) = S_{in}(i) - S_{in}(i-1) + 0.999 \times S_{of}(i-1);$$

where $S_{in}(i)$ is an i-th sampling point of the sound signal, and $S_{of}(i)$ is an i-th sampling point of the sound signal that is applied by the DC offset compensation. In addition, an existing formula for performing the pre-emphasis is:

$$S_{pe}(i) = S_{of}(i) - 0.91 \times S_{of}(i-1)$$

where $S_{pe}(i)$ is an i-th sampling point after the sound signal is applied by the pre-emphasis step. However, since 0.999 can be equivalent to $1-2^{-10}$, the present embodiment can change the multiplication in the existing formula of DC offset compensation to one-time subtraction, that is to say, the existing formula of the DC offset compensation step is modified as:

$$S_{of}(i) = S_{in}(i) - S_{in}(i-1) + S_{of}(i-1) - 2^{-10} S_{of}(i-1).$$

Similarly, since 0.97 can be equivalent to $1-2^{-5}$, the present embodiment can also modify the existing formula of the pre-emphasis step as:

$$S_{pe}(i) = S_{of}(i) - S_{of}(i-1) + 2^{-5} S_{of}(i-1).$$

In other words, the optimization method of FIG. 1 can further include, in step S110 for performing the DC offset compensation step, using a formula $S_{of}(i) = S_{in}(i) - S_{in}(i-1) + S_{of}(i-1) - 2^{-10} S_{of}(i-1)$ to apply a DC offset compensation on each of the plurality of sampling points of the sound signal, and the optimization method can further include, in step S120 for performing the pre-emphasis step, using a formula $S_{pe}(i)=S_{of}(i)-S_{of}(i-1)+2^{-5}S_{of}(i-1)$ to apply the pre-emphasis on each of the plurality of sampling points of the sound signal that is applied by the DC offset compensation. In contrast, the plurality of sampling points referred to in step S130 for performing the framing step are the plurality of sampling points of the sound signal applied by the pre-emphasis step.

In conclusion, compared with the existing technique, the formulas of the DC offset compensation and the pre-emphasis of the present embodiment will not be complicated by the existence of multiplication. It should be understood that the optimization method of the present embodiment can enable the implementation of the MFCC to save more area and power consumption.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An optimization method for an implementation of mel-frequency cepstral coefficients, the optimization method comprising:
performing a framing step, including:
using a 400×16 static random access memory to temporarily store a plurality of sampling points of a sound signal with overlap; and
decomposing the sound signal into a plurality of frames, wherein each of the plurality of frames is 400 of the sampling points, and there is an overlapping region between adjacent two of the plurality of frames, and the overlapping region includes 240 of the sampling points;
performing a windowing step including multiplying each of the plurality of frames by a window function in a bit-level design, and
performing a fast Fourier transform (FFT) step including applying a 512 point FFT on a frame signal generated after the framing step and the windowing step are performed, so as to obtain a corresponding frequency spectrum.

2. The optimization method according to claim 1, wherein the FFT step further includes using a coordinate rotational digital computer to complete all of multiplication operations of the 512 point FFT.

3. The optimization method according to claim 1, further comprising:
performing a mel filtering step including applying 26 filters with different orders on the frame signal to obtain a mel scale.

4. The optimization method according to claim 3, wherein the mel filtering step further includes utilizing two multipliers and two adders to implement all operations of the mel filtering step.

5. The optimization method according to claim 3, further comprising:
performing a nonlinear conversion step, including:
changing a formula using a natural logarithm that is used to obtain a logarithm of the mel scale to a formula using a binary logarithm to reduce one multiplier, and implementing the binary logarithm by shifting and interpolation to obtain logarithmic energy.

6. The optimization method according to claim 5, further comprising:
performing a discrete cosine transform step on the obtained logarithmic energy by using 13 multipliers and 13 accumulators to obtain 13 mel-frequency cepstral coefficients (MFCCs).

7. The optimization method according to claim 1, further comprising performing a DC offset compensation step and a pre-emphasis step before performing the framing step.

8. The optimization method according to claim 7, further comprising:
performing the DC offset compensation step including:
using a formula $S_{of}(i)=S_{in}(i)-S_{in}(i-1)+S_{of}(i-1)-2^{-10}S_{of}(i-1)$ to apply a DC offset compensation on each of the plurality of sampling points of the sound signal, wherein $S_{in}(i)$ is an i-th sampling point of the sound signal, and $S_{of}(i)$ is an i-th sampling point of the sound signal that is applied by the DC offset compensation.

9. The optimization method according to claim 8, further comprising:
performing the pre-emphasis step including:
using a formula $S_{pe}(i)=S_{of}(i)-S_{of}(i-1)+2^{-5}S_{of}(i-1)$ to apply a pre-emphasis on each of the plurality of sampling points of the sound signal that is applied by the DC offset compensation, wherein $S_{pe}(i)$ is an i-th sampling point of the sound signal that is applied by the pre-emphasis.

* * * * *